June 13, 1950 — F. R. MYERS — 2,511,292
FILTER
Filed Feb. 10, 1945
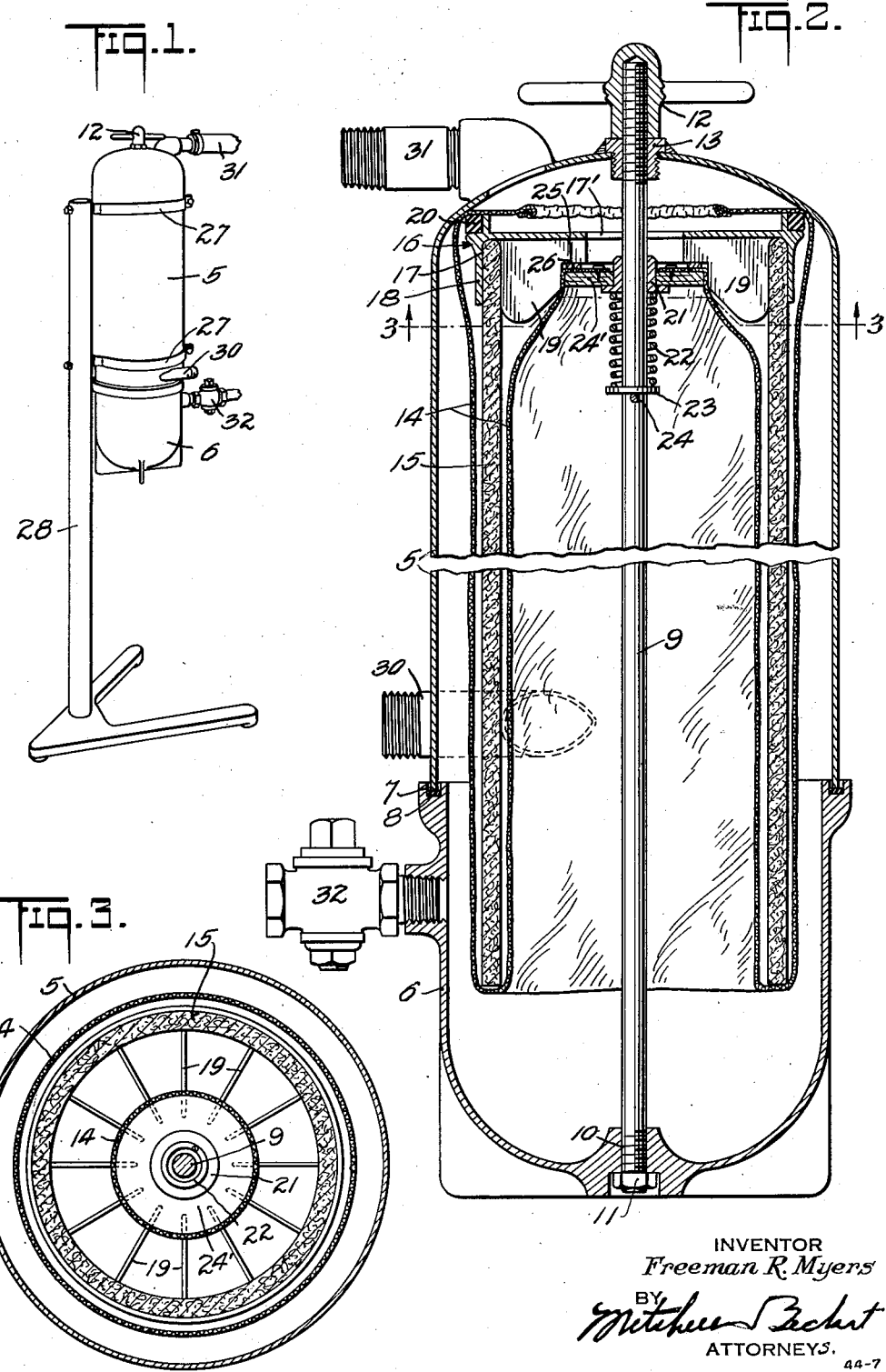
INVENTOR
Freeman R. Myers
BY
Mitchell Bechert
ATTORNEYS.

Patented June 13, 1950

2,511,292

UNITED STATES PATENT OFFICE 2,511,292

FILTER

Freeman R. Myers, West Hartford, Conn., assignor to The New Britain Machine Company, New Britain, Conn., a corporation of Connecticut Application February 10, 1945, Serial No. 577,224

2 Claims. (Cl. 210—183)

This invention relates to filters for liquids.

It is the general object of the invention to provide an improved, simple form of filter.

It is another object of the invention to provide a filter so constructed and arranged as to attain a substantial economy of space.

It is a further object of the invention to provide a filtration apparatus such that the filter element is readily replaceable.

Other objects and various features of novelty and invention will be hereinafter pointed out or will become apparent to those skilled in the art.

With these and other objects and advantages in view, the invention consists in the features, combinations, details of construction and arrangements of parts which will first be described in connection with the accompanying drawing and then more particularly pointed out.

In the drawing—

Fig. 1 is an isometric view of a filter supported in position on a stand;

Fig. 2 is a vertical central sectional view on an enlarged scale of the filter shown in Fig. 1;

Fig. 3 is a sectional view taken substantially in the plane of the line 3—3 of Fig. 2.

The filter in a preferred form includes a shell formed in two parts for separation as illustrated. I employ an upper cylindrical shell section 5 and a similar lower sump section 6. The joint between the sections 5 and 6 may be formed by a circumferential channel 7 in one tank section and in the bottom of that channel there may be a packing ring 8 upon which the bottom edge of the other tank section rests so that a leak proof joint is formed.

The two tank sections are held together by suitable means and in the preferred form I employ a central rod 9, which may be rigidly screwed to the sump section 6 as by means of a screw thread 10 and lock nut 11 as will be understood.

The rod 9 may pass freely through the top of the section 5 and a screw clamp 12 may be threaded on the upper end of the rod and engage the upper end of the tank section or a fitting 13 secured thereto so that the two sections 5—6 may be securely held together and in a leak proof manner. The filter element in the preferred form is so constructed and arranged that when the tank parts are separated the filter element and associated parts will remain with one tank section, in this case the lower section 6.

The filter element preferably includes a fabric bag 14 which is doubled back upon itself around a screen spacer 15, preferably formed of wire mesh or link material so as to permit a free passage of filtrate. In the form illustrated I employ a top filter cap 16 which has an outlet passage 17' therein. The filter cap 16 carries the screen 15 depending therefrom, and in the form illustrated, the upper end of the screen 15 fits into and is held in an annular groove 17 formed between the depending skirt 18 and the outer edges of a plurality of radial fins forming a part of the filter cap. The filter cap may be provided with a packing washer or gasket 20 fitting in a suitable seat in the filter cap as will be understood. This filter cap 16 is resiliently urged upwardly so as to clamp the filter bag in tight engagement with the inside of the top of the tank section 5 as will be later described.

In the form illustrated the rod 9 carries a sliding collar 21 which collar is urged upwardly by means of coil spring 22 interposed between the collar 21 and a washer 23 supported on the rod 9 as by means of a pin 24. The bottom of the filter bag 14 is supported by the collar 21 and urged upwardly by the spring 22. As illustrated, the bottom of the bag 14 has a hole in it for the passage of the rod 9 and is supported on the collar 21 as by means of a ring 24'. If desired, the ring 24' may be formed of wood and the bottom of the bag may be tacked to it at intervals as illustrated. I may also employ a washer 25 resting on the filter bag and urged into engagement with seats 26 on the fins or flanges 19. Thus, the bag will be held in a leak proof manner against the collar assembly 21.

The filter may be disassembled and reassembled in the following manner: the screw clamp 12 is removed so as to permit the sump section 6 to be dropped away from the upper section 5, which in a preferred form will be supported as by means of straps 27—27 carried by the stand 28. The sump section 6 may rest on the floor and the rod 9 will be supported in upright position in the sump section. The bottom of the bag is then slipped over the rod 9 and may rest on or be screwed to the slide collar 21 as heretofore described. The washer 25 (when employed) is then set in place. Thereafter, the filter cap 16 is dropped into place over the end of the rod 9 so that the seat surfaces 26 on the fins 19 rest on the bottom of the bag or on the washer 25 (when employed). The open end of the bag may then be pulled over the screen spacer 15 like a sleeve and over the top of the screen cap 16 so that a part of the top of the bag rests on the sealing washer 20. Thereafter, the sump section 6 with the assembled filter bag and filter cap 16 in place may be moved into the upper tank section 5 and the rod 9 will pass through the fitting 15 after which the screw cap 12 is put in place to make the assembly complete.

It will be seen that the spring 22 acting through the collar 21 will urge the bottom of the bag into tight fitting engagement with the filter cap 16 and the latter in turn will be resiliently urged upwardly so as to clamp the top of the filter bag in tight fitting engagement with the tank section 5 as illustrated.

The liquid to be filtered, for example coolant from a grinding machine, is passed into the filter tank through the connection 30. Any heavier particles in the liquid will settle by gravity into the sump section 6. Since the liquid to be filtered, fills the entire tank, the liquid will pass through both the inner and outer annular sides of the bag and into the screen spacer 15. The filtrate passes freely through the spacer 15 and upwardly between the fins 19, then through the passages 17' and out the filtrate discharge 31.

When it is desired to clean the filter the pump circulating the coolant is shut off and thereafter the drain cock 32 is opened so as to drain the filter tank to a point below the joint between the two tank sections. Thereafter, the screw clamp 12 is removed and the sump section 6 together with the entire filter assembly is dropped down. The filter assembly may then be removed, the sump cleaned out and a fresh filter element applied as heretofore described, after which the parts may be reassembled for further filtering operation.

It will be seen that I have provided an extremely simple form of filter which permits the employment of a long bag filter within a comparatively small space. The filter element is resiliently clamped in place and in leak proof manner by the mere assembling operation. The parts are few in number and simple in construction so there is little likelihood of any derangement of or injury to the filter parts.

The filter has been illustrated as supported on a stand 28, since that is a convenient method of supporting a coolant filter in any desired position relative to the machine in connection with which the filter operates. It will, of course, be understood that the filter could be otherwise supported, for example on the floor, and that the tank parts could be separated by removing the top section rather than the bottom section as described.

While the invention has been described in considerable detail, and a preferred form illustrated, it is to be understood that many changes and modifications may be made within the scope of the invention as defined in the appended claims.

I claim:

1. In a filter, a tank formed of two separable parts one above the other, central supporting means carried by the lower of said parts and projecting vertically within the upper of said parts, securing means on the upper of said parts and engaging said supporting means for securing said two parts together, a ring slidable on said securing means and in sealing relation therewith, generally cylindrical screen means between said supporting means and the inner wall of said tank and including an upper peripherally extending portion conforming generally and in substantially longitudinal alignment with a peripherally extending portion of the inner wall of said upper part, said screen means also including a part in longitudinal alignment with a part of said ring, resilient means on said supporting means and urging said ring and said screen-means part together and urging said peripherally extending portions together, and a filter bag having in the bottom thereof a hole big enough to fit over said supporting means and small enough so that said bottom may rest on said ring; said filter bag extending between said ring and said screen-means part, then extending downwardly from said ring between said supporting means and said screen means, then around the bottom of said screen means and upwardly outside of said screen means, then between said peripherally extending portions, and then generally radially inwardly of the locus of engagement of said peripherally extending portions, whereby a doubled-up filter bag may not only be resiliently urged into sealing engagement with said tank and with said supporting means, but the bag may be easily doubled-up in the process of assembling or servicing the filter.

2. A filter according to claim 1, and including a ring of resilient material between said bag and one of said peripherally extending portions, whereby said resilient material may enhance the sealing fit of said bag at said peripherally extending portions.

FREEMAN R. MYERS.

REFERENCES CITED

The following references are of record in the file of this patent:

UNITED STATES PATENTS

| Number | Name | Date |
|---|---|---|
| 579,769 | Pich | Mar. 30, 1897 |
| 609,769 | Barr | Aug. 30, 1898 |
| 689,307 | Hermes | Dec. 17, 1901 |
| 733,622 | Brownlow | July 14, 1903 |
| 1,047,413 | Hopkins | Dec. 17, 1912 |
| 1,148,237 | Kneuper | July 27, 1915 |
| 1,407,763 | Langston | Feb. 28, 1922 |
| 1,494,677 | Feldmeier | May 20, 1924 |
| 1,633,818 | Hogstrom | June 28, 1927 |
| 1,737,313 | Kamrath | Nov. 26, 1929 |
| 1,805,903 | Bull | May 19, 1931 |
| 1,840,153 | Bull | Jan. 5, 1932 |
| 2,000,137 | Kelley | May 7, 1935 |
| 2,007,615 | Ross | July 9, 1935 |
| 2,174,769 | White | Oct. 3, 1939 |
| 2,274,352 | Wood | Feb. 24, 1942 |
| 2,332,188 | Andrews | Oct. 19, 1943 |
| 2,339,703 | Kamrath | Jan. 18, 1944 |

FOREIGN PATENTS

| Number | Country | Date |
|---|---|---|
| 9,421 | France | Aug. 19, 1908 |
| (Addition to No. 370,467) | | |